Patented Apr. 22, 1930

1,755,515

UNITED STATES PATENT OFFICE

CURT RÄTH, OF BERLIN, GERMANY

PROCESS FOR THE MANUFACTURE OF A COMPOUND OF ISONAPHTHYRIDIN

No Drawing. Application filed November 10, 1926, Serial No. 147,608, and in Austria October 17, 1925.

My invention relates to the production of isonaphthyridin and derivatives thereof by the treatment of 3-aminopyridine according to the usual quinoline synthesis.

My invention can be carried out in several ways: For instance glycerine and sulphuric acid may be brought into reaction, in the presence of oxidizing means, such as, for instance, nitrobenzol or arsenic acid, with the originating materials; according to an alternative method the originating materials may be brought into reaction with pyro-racemic acid and benzaldehyde.

The products produced in accordance with the invention find use in therapeutical application.

Examples 1. 135 grms. of α-chloro-β-aminopyridine are heated with 150 grms. of arsenic acid, 280 grms. of sulphuric acid and 300 grms. of glycerine on the sand bath under a reflux condenser for some time. The reaction mixture after cooling is diluted with water and made alkaline with soda. The precipitated brownish coloured crystal mass is separated and recrystallized from hot water with addition of animal charcoal. The 1-oxy-isonaphthyridin which is obtained forms white crystals melting at 258° C. They are soluble in mineral acids and alkalies and easily soluble in chloroform, hot alcohol and hot water. The reaction may be represented as follows:

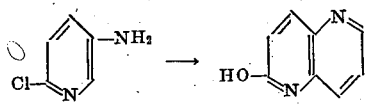

2. 10 grms. of 3-aminopyridine mixed with 30 grms. of glycerine, 15 grms. of arsenic acid and 100 grms. of concentrated sulphuric acid, are heated in a reflux condenser on the sand bath until a reaction commences. As soon as the main reaction slackens the mass is maintained boiling for a further two hours. By treating the reaction mixture in the known way the base is obtained as a dark red crystal cake; this is readily soluble in all the ordinary organic solvents. From carbon bisulphide fine white needles of melting point 72° C. are obtained on dilution. The isonaphthyridin boils at 112° C. under a pressure of 12 mm. and solidifies in the receiver immediately to snow-white crystals which gradually turn yellowish in the air. The reaction may be represented as follows:

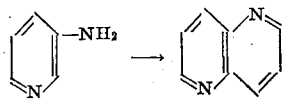

3. 15 grms. of 2-oxy-5-aminopyridine hydrochloric, 15 grms. of arsenic acid and 28 grms. of concentrated sulphuric acid are heated with 30 grms. of glycerine to boiling for 4-5 hours on the sand bath. The 2-oxy-isonaphthyridin is precipitated from solution by the addition of concentrated soda solution. After twice recrystallizing from water containing animal charcoal, 6 grms. of solid white oxy-isonaphthyridin of melting point 258° C. are obtained. The reaction may be represented as follows:

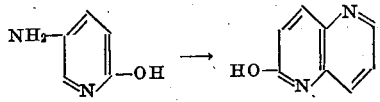

What I claim is:

1. A process for the manufacture of isonaphthyridin which consists in treating β-amino-pyridin with glycerin and sulfuric acid in presence of oxidizing agents.

2. A process for the manufacture of isonaphthyridin which consists in treating a substituted β-aminopyridin with glycerin and sulfuric acid in presence of oxidizing agents.

3. A process for the manufacture of isonaphthyridin which consists in treating α'-substituted-β-aminopyridin with glycerin and sulfuric acid in presence of oxidizing agents.

4. A process for the manufacture of isonaphthyridin which consists in treating α'-chloro-β-aminopyridin with glycerin and sulfuric acid in presence of oxidizing agents.

Signed at Berlin, in the country of Brandenburg and State of Prussia, this 18th day of October, A. D. 1926.

CURT RÄTH.